United States Patent [19]

Christian et al.

[11] 4,031,440
[45] June 21, 1977

[54] TRANSIENT LOAD DAMPING CIRCUIT FOR EXCAVATOR

[75] Inventors: Edward H. Christian, Brookfield; Donald M. Mains, Greendale; James H. Treiber, Milwaukee, all of Wis.

[73] Assignee: Bucyrus-Erie Company, South Milwaukee, Wis.

[22] Filed: May 20, 1976

[21] Appl. No.: 688,488

[52] U.S. Cl. .............................. 318/432; 318/433; 318/140; 318/141
[51] Int. Cl.² .......................................... H02P 7/00
[58] Field of Search .......... 318/140, 141, 144, 145, 318/158, 432, 433

[56] References Cited

UNITED STATES PATENTS 3,867,678  2/1975  Stoner .............................. 318/432

Primary Examiner—B. Dobeck
Assistant Examiner—Eugene S. Indyk
Attorney, Agent, or Firm—Quarles & Brady

[57] ABSTRACT

A Ward-Leonard drive system for a dragline excavator includes a feedback circuit which connects to the motor-generator armature loop to sense a signal proportional to motor armature counter emf and rate of change of armature current. The feedback circuit takes the second derivative of this signal and applies it to a circuit which controls motor speed and torque. The feedback circuit alters the response of the drive system to sudden increases in motor load caused by rough digging and thereby reduces transient loading on the mechanical elements of the drive system.

14 Claims, 5 Drawing Figures

TRANSIENT LOAD DAMPING CIRCUIT FOR EXCAVATOR

BACKGROUND OF THE INVENTION

The field of the invention is excavator drive systems, and more particularly, means for reducing the transient loading on the mechanical portion of an excavator drive by compensating the response of the driving electrical system to sudden changes in loading.

Until recently mechanical means were used almost exclusively in the excavator field to suppress mechanical resonances and damp the shock of sudden changes in loading. For example, resilient cushions, dash pots and shock absorbers of various configurations were employed to reduce the peak transient loading on the mechanical elements of large shovels and dragline excavators caused by the impact of the bucket with rocks during rough digging. In addition to being quite costly, such devices add considerable weight and require continuous maintenance. Also, in the case of dragline excavators there are few effective mechanical means for reducing transient loading on the dragrope which connects directly to the bucket.

More recently, efforts have been made to reduce the effects of transient loading on the mechanical elements of an excavator drive system by compensating the driving electrical system. As disclosed in U.S. pat. No. 3,867,678 issued on Feb. 18, 1975 to Thomas A. Stoner and assigned to the Bucyrus-Erie Company, assignee of the present invention, such transient loading on the mechanical system is reflected into the driving electrical system as a sudden change in motor armature current, voltage or other operating parameter. By sensing such a change and developing an appropriate feedback signal for the motor drive control circuit, the loading on the driven mechanical elements can be significantly reduced during rough digging.

SUMMARY OF THE INVENTION

The present invention relates to a Ward-Leonard drive system for a dragline excavator in which a feedback circuit is employed in combination with the control circuit to compensate the drive system and to thereby reduce transient loading on the dragrope. More specifically, the feedback circuit includes inputs which connect to the Ward-Leonard drive system to sense a signal proportional to motor speed and the rate of change of motor armature current. The feedback circuit includes means for taking the second derivative of that signal and applying it as a feedback signal to the motor control circuit. When sudden increases in load occur, a momentary reduction in the driving force generated by the motor occurs as a result of this feedback signal.

A general object of the invention is to reduce the transient peak loading on the dragrope of an excavator. When the bucket makes impact with a rock during digging, the speed of the motor in the Ward-Leonard drive system is momentarily reduced and the counter emf generated across its armature drops. It is a discovery of the present invention that the peak transient loading on the dragrope can be substantially reduced by taking the second derivative of a signal proportional to motor armature counter emf and applying it through the motor control circuit to momentarily reduce the torque output of the motor.

Another object of the invention is to maintain system stability. Although transient peak loading may be effectively reduced with a feedback signal derived from motor counter emf, the stability of the drive system is significantly affected by its use. It is a further discovery of the present invention, therefore, that the response of the electrical control system to transient loading can be properly damped by also developing a feedback signal proportional to the third derivative of motor armature current and applying it along with the above described motor speed feedback signal to the control circuit.

Another object of the invention is to provide a feedback signal which is comprised solely of passive elements. The control circuitry in an excavator must be rugged to withstand the severe operating conditions which are typically encountered. Not only must the electrical circuitry be reliable, but it also must be easy to maintain for relatively unskilled maintenance personnel. The feedback circuit of the present invention utilizes highly reliable passive elements such as resistors, capacitors and diodes to generate a feedback signal of suitable amplitude.

A more specific object of the invention is to reduce transient loading on the driven mechanical system during digging without significantly affecting the performance of the excavator. Steering diodes are employed in the feedback circuit to limit its operation to the digging portion of the excavator operating cycle. During payout of the bucket, therefore, the feedback circuit does not limit the acceleration or deceleration of the bucket.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims for interpreting the scope of the present invention.

DESCRIPTION OF THE PREFERRED EMBODIMENT

Figure 1:
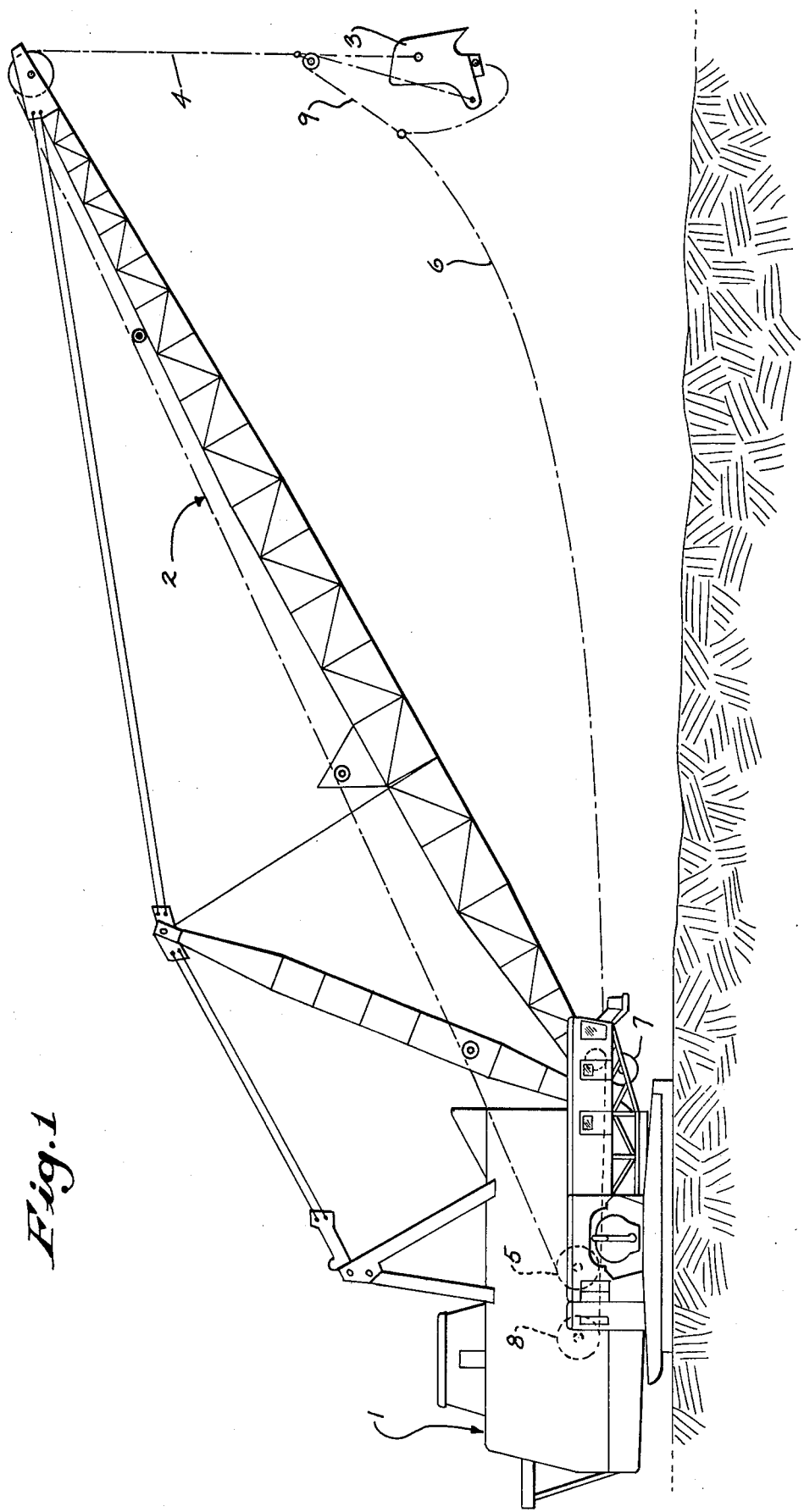
FIG. 1 is an elevation view of a dragline type excavator which employs the present invention.

Referring to FIG. 1, a dragline excavator having a housing 1, and a boom 2 is situated adjacent to a dig site. A bucket 3 is supported by means of a hoist rope 4 which passes over a boom point sheave at the outer end of the boom 2. A hoist drum 5 is situated in the house 1 and connected to the hoist rope 4 to raise and lower the bucket 3 in the standard manner. Attached to the front of the bucket 3 is a braided steel dragrope 6 which passes into the house 1 through a fairlead assembly 7 and is attached to a power driven drum 8. A conventionally rigged dump line 9 is attached to the bucket 3 and dragrope 6. As an example, the excavator to which the present invention is applicable may have a boom length greater than 250 feet, a bucket capacity greater than 40 cubic yards, and the dragrope may have a diameter of three inches or more.

The excavator in FIG. 1 is shown with the bucket 3 in a dumping position which is the last step in the operating cycle. A new cycle is initiated by lowering the bucket 3 to the ground and then dragging it toward the excavator housing by hauling in the dragrope 6. During this digging portion of the operating cycle, significant forces are generated in the dragrope 6 and it is during this portion of the operating cycle that high transient loads are generated as the bucket strikes rocks. After the dig portion of the operating cycle is completed, the bucket 3 is lifted and paid out by releasing the dragrop 6 and hauling in on the hoist rope 4. No undesirable loading is imposed on the dragrope 6 during the payout portion of the operating cycle, although significant loading may be imposed on it by the deceleration of the bucket 3 at the end of the payout.

Figure 2:
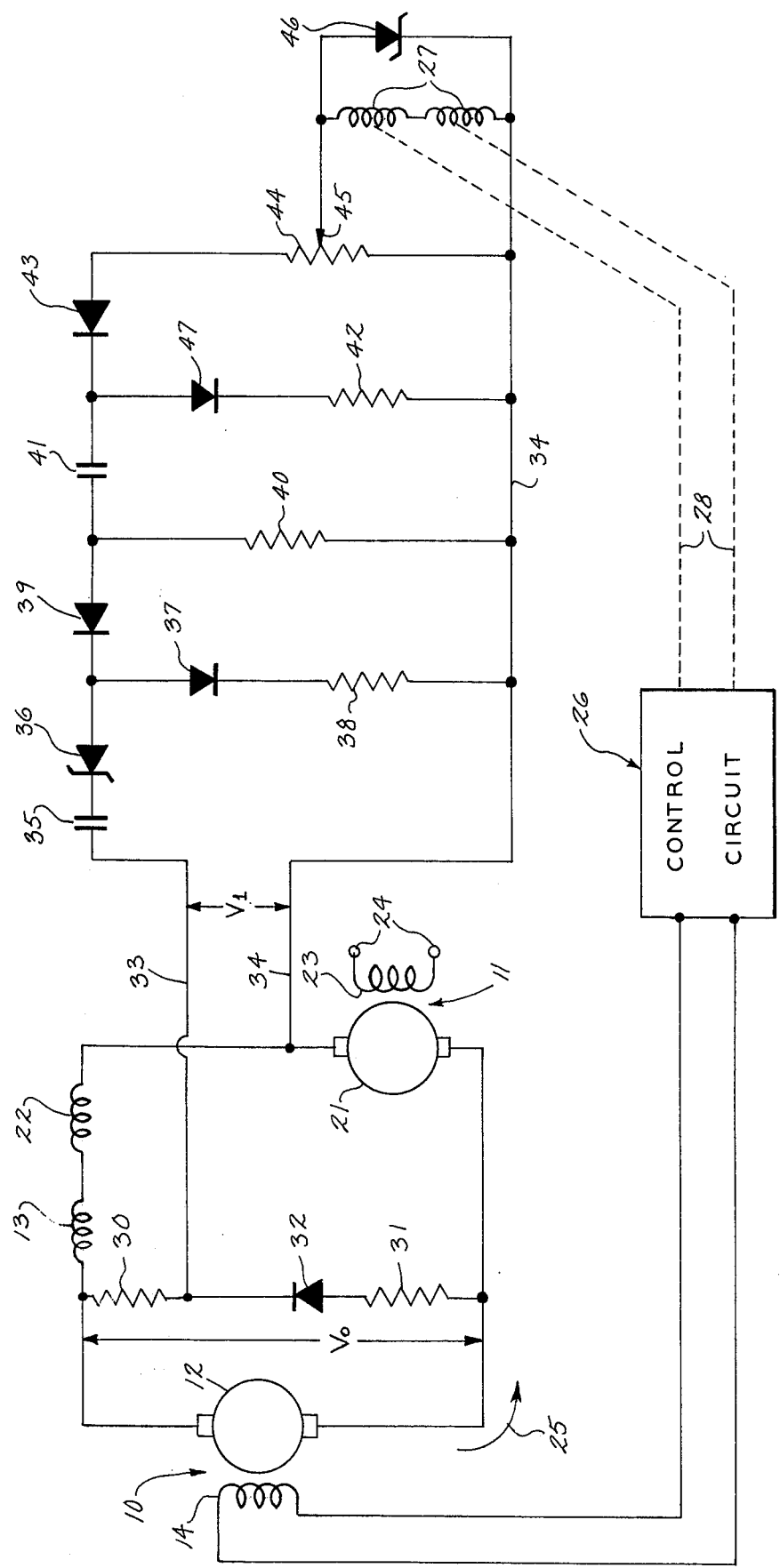
FIG. 2 is an electrical circuit diagram of the dragrope drive system which employs the present invention.

Referring particularly to Fig. 2, the drum 8 which controls the dragline 6 is driven by a Ward-Leonard drive comprised of a d-c generator designated generally at 10 connected in series with a d-c motor designated generally at 11. The generator 10 includes an armature 12 which is connected in series with a generator commutating and compensating field winding 13. The generator 10 also includes a field winding 14 which is magnetically coupled to the generator armature 12, and which operates to induce a d-c voltage therein when supplied with direct current by a control circuit 26. The d-c motor 11 includes an armature 21 which is connected in series with a commutating and compensating field winding 22. The motor 11 also includes a shunt field winding 23 which connects a pair of d-c voltage supply terminals 24. The motor 11 and generator 10 are connected together to form a standard Ward-Leonard drive which is commercially available in many sizes and ratings. When applied to the Bucyrus-Erie Model 1370W dragline, for example, the motor 11 and generator 10 have the following ratings:

General Electric generator Model No. MCF866B which generates 836 kilowatts at 475 volts d-c when driven at 1200 rpm.

General Electric motor Model No. MDP622AER which develops 1045 horsepower at 740 rpm when supplied with 475 volts d-c.

When current flows in the generator field winding 14, current is induced in the armature loop and flows in the direction indicated by the arrow 25 to drive the motor 11. The motor shaft is coupled to the drum 8 and the torque which is generates hauls in the dragrope 6.

Current flow in the generator field winding 14 is controlled by the control circuit 26 which receives command information from the excavator operator. The control circuit 26 is similar to that disclosed in U.S. Pat. No. 3,518,444 issued to D. E. Barber on June 30, 1970 and entitled "Control System for Excavating Equipment". It includes a magnetic amplifier, or saturable reactor (not shown in the drawings) which includes windings that receive the command information and additional windings which receive feedback information such as motor speed and torque. The feedback signals are summed magnetically with the command signal to provide an error signal that is applied to the generator field winding 14.

The feedback circuit of the present invention is applied to a pair of series connected control windings 27 which are associated with the saturable reactor in the control circuit 26 and magnetically linked therewith as indicated by dashed lines 28. The feedback signal generated by the circuit of the present invention is magnetically summed with the other existing feedback signals and the command signal to alter the response of the control circuit 26 and the Ward-Leonard drive to sudden changes in load such as occur when the bucket 3 strikes a rock during digging.

Referring particularly to FIG. 2, the feedback circuit of the present invention includes a voltage divider comprised of a pair of resistors 30 and 31 and a diode 32 which connect in series across the generator armature 12. A lead 33 connects at the juncture of the diode 32 and resistor 30 and a second lead 34 connects to the juncture of the motor armature 21 and its commutating and compensating field winding 22. The voltage ($V_1$) across the leads 33 and 34 serves as the input to the feedback circuit. The voltage $V_0$ generated by the generator armature 12 may be expressed as follows:

$$V_0 = E_{CEMF} + I(R_{21} + R_{22} + R_{13})(dI/dt)(L_{21} + L_{22} + L_{13})$$

A fraction ($K$) of this voltage $V_0$ is taken to provide the input voltage $V_1$, which may be expressed as follows:

$$V_1 = KE_{CEMF} - I[(1-K)(R_{22} + R_{13}) - KR_{21}] - (dI/dt)[(1-K)(L_{22} + L_{13}) - KL_{21}]$$

The input signal $V_1$ is thus a signal which includes a component proportional to motor speed ($KE_{CEMF}$), a component proportional to the inductive voltage drop across the motor and generator compensating and commutating field windings 22 and 13, and a component proportional to the ohmic, or resistive, voltage drop across the windings 22 and 13. The value of K is determined by the relative values of the voltage divider resistors 30 and 31 and it should be apparent from the above equation that when K is relatively small (from 0.2 to 0.4), the second and third armature current components of the input voltage $V_1$ are negative, or opposite, in polarity from the motor counter emf component. It is a discovery of the present invention that when the input signal $V_1$ is differentiated twice by a diode, resistor and capacitor network which is now to be described, the resulting motor counter emf component substantially reduces the peak loading on the dragrope and the resulting negative motor armature current components improve the stability of the system.

Referring again to FIG. 2, the lead 33 of the feedback circuit connects to one plate of a first charging capacitor 35 and the other lead 34 serves as circuit common. The other plate on the capacitor 35 connects to the cathode of a zener diode 36 and the anode on the zener diode 36 connects to the anode of a first steering diode 37. The cathode on the first steering diode 37 connects to circuit common through a resistor 38. The cathode on a second steering diode 39 connects to the juncture of the zener diode 36 and steering diode 37 and its anode connects to circuit common through a second resistor 40 and to one plate of a second charging capacitor 41. The other plate of the capacitor 41 connects to the cathode of a third steering diode 43 and to circuit common through a third resistor 42 and a fourth steering diode 47. The anode on the steering diode 43 connects to circuit common through the resistance element of a potentiometer 44 and the slider 45 on the potentiometer 44 connects to the control windings 27. A zener diode 46 is connected to circuit common in parallel with the windings 27.

During the digging portion of the operating cycle the first capacitor 35 is charged through a path which includes the steering diodes 32 and 37, the zener diode 36 and the resistors 31 and 38 by a portion of the current indicated by the arrow 25. When the bucket 3 impacts with a rock or other relatively immovable object, motor speed suddenly drops with a concurrent drop in motor armature counter emf and rise in motor armature current. As a result, the voltage $V_1$ across the leads 33 and 34 drops below the voltage on the capacitor 35 and the capacitor will begin to discharge through a conductive path formed by the second steering diode 39 and second resistor 40. The voltage generated across the second resistor 40 as capacitor 35 discharges is applied across a series branch comprised of potentiometer 44, third steering diode 43 and capacitor 41. The capacitor 41 is thus charged and the charging current generates a voltage across the potentiometer resistance element 44 which comprises the feedback signal that is applied to the control windings 27. When steady state conditions are achieved, the voltage across the first charging capacitor 35 is equal to or less than the applied voltage $V_1$ and the second charging capacitor 41 commences to discharge through the fourth steering diode 47 and resistor 42.

The zener diode 46 limits the maximum feedback signal which can be generated and applied to the control windings 27, whereas zener diode 36 along with diodes 39 and 43 serve to establish a minimum threshold which effectively decouples the feedback circuit from the armature loop for relatively small changes in input voltage $V_1$. The feedback circuit is thus not responsive to changes in motor loading during normal digging and is relatively immune to electrical noise which is typically present in the armature loop.

Figure 3A:
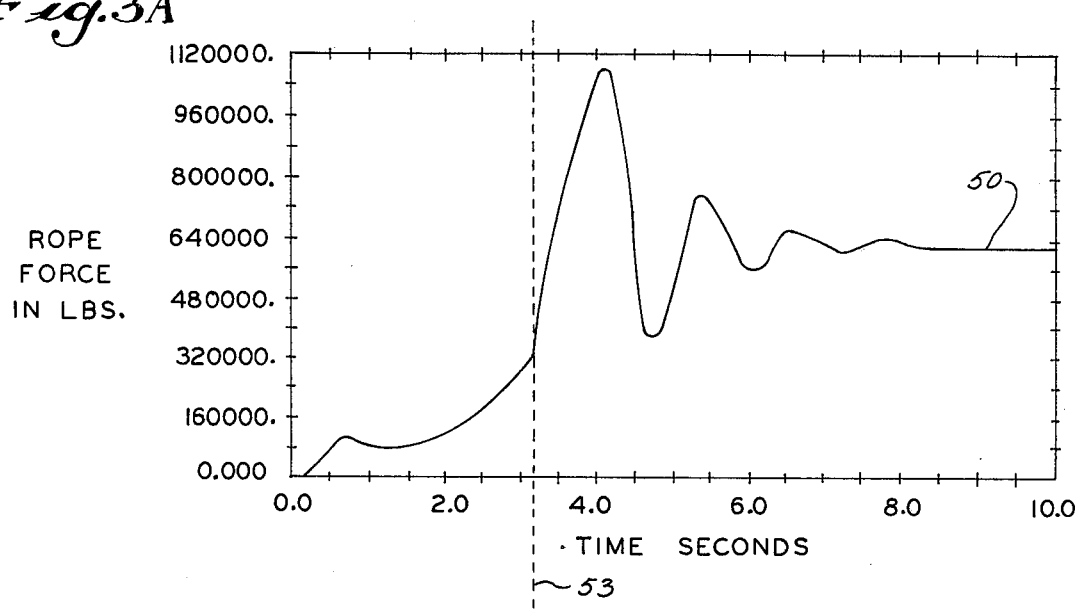
FIGS. 3A-C are graphic illustrations of the transient loading on the dragrope.
Figure 3B:
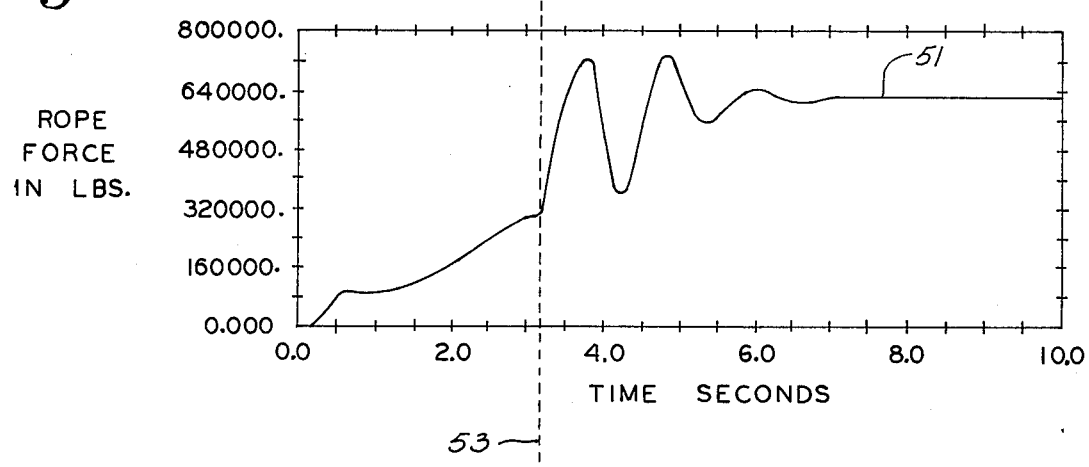
Figure 3C:
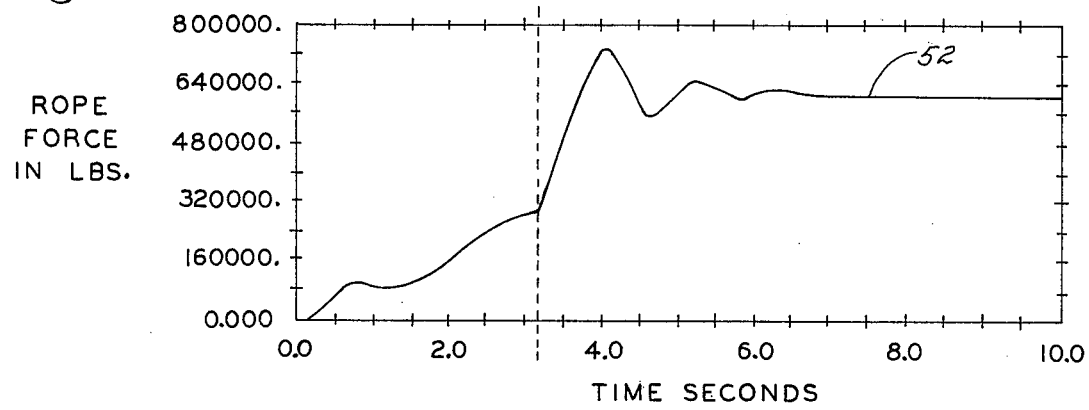

Referring particularly to FIGS. 3A–C, the results obtained by employing the invented feedback circuit on a Bucyrus-Eric Model 1370W dragline with the resistors 30 and 31 selected to provide a value of 0.3 for the constant K. The graphs plot the tension, or force, on the dragrope 6 as a function of time when the bucket 3 makes impact with an immovable rock. Graph 50 in FIG. 3A illustrates the transient loading in existing machines which do not employ the present invention, graph 51 in FIG. 3B illustrates the reduction in peak transient loading accomplished by using a feedback signal proportional to the second derivative of motor armature counter emf, and graph 52 in FIG. 3C illustrates the improved stability accomplished by subtracting from the feedback signal of graph 51 a component proportional to the third derivative of motor armature current. Impact is made with the immovable rock in each case at approximately 3.2 seconds as indicated by the dashed line 53. The force on the dragrope 6 rises sharply after impact to a peak value in FIG. 3A of approximately 1,020,000 pounds when the system is not compensated and then settles to a stall value of approximately 620,000 pounds. When the system is compensated by employing the circuit of the present invention, the transient loading on the dragrope 6 rises to a value of approximately 740,000 pounds, or in other words, approximately 27 percent less than the uncompensated drive system. This reduction in transient loading represents a significant increase in rope life.

It should be apparent to those skilled in the art that a number of variations can be made in the described preferred embodiment without departing from the spirit of the invention. For example, the d-c generator may be replaced by other known d-c voltage generating means such as static d-c power supplies.

We claim:

1. In a Ward-Leonard drive system for an excavator having a control circuit which is responsive to command and feedback signals to control the torque output of the drive system motor by controlling the field current of the drive system generator, the improvement therein comprising:
   means connected to the armature loop formed by said motor and generator for sensing a signal having one component proportional to motor armature counter emf and a second component proportional to the rate of change of motor armature current; and
   feedback circuit means connected to receive said sensed signal and generate a feedback signal to said control circuit, said feedback circuit means includes first differentiator means for providing a signal proportional to the first derivative of said sensed signal and second differentiating means for providing said feedback signal which is proportional to the second derivative of said sensed signal.

2. The improvement as recited in claim 1 in which said first and second differentiator means each includes a charging capacitor and series connected resistor.

3. The improvement as recited in claim 2 in which a steering diode is connected in series with each of said resistors to block current flow therethrough in one direction.

4. The improvement as recited in claim 3 in which a second steering diode is connected in shunt with each of said resistors and associated first steering diodes.

5. In an excavator drive system the combination comprising:
   a drive motor having an armature, and a field winding connected in series with the armature;
   a generator having an armature connected to said motor armature to form a loop which includes said motor and generator armatures and said motor field winding;
   a voltage divider connected across said generator armature and including a pair of series connected resistors;
   a feedback circuit having one input lead connected to the juncture of said voltage divider resistors and a second input lead connected to the juncture of said motor armature and its associated field winding, said feedback circuit including means for generating a feeback signal proportional to the second derivative of the signal applied to said input leads; and
   a control circuit connected to effect the operation of said generator and connected to receive said feedback signal, said control circuit being responsive to said feedback signal to alter the operation of the generator.

6. The excavator drive system as recited in claim 5 in which a diode is connected in series with said voltage divider resistors.

7. The excavator drive system as recited in claim 5 in which said feedback circuit includes:
   a first capacitor and series connected resistor connected across said input leads; and
   a second capacitor and series connected resistor connected across said first resistor,
   wherein said control circuit is connected to said second resistor.

8. The excavator drive system as recited in claim 7 in which a first steering diode is connected in series with said first resistor to block current flow therethrough in one direction, and a second steering diode is connected in series with said second resistor to block current flow therethrough in one direction.

9. The excavator drive system as recited in claim 8 in which a third steering diode is connected in shunt with said first resistor and first steering diode to block current flow in the opposite direction therefrom and a fourth steering diode is connected in shunt with said second resistor and second steering diode to block current flow in the opposite direction therefrom.

10. In an excavator drive system the combination comprising:
- a drive motor having an armature, and a field winding connected in series with the armature;
- d-c voltage generating means having a pair of leads connected to said motor armature to form a loop which includes said motor armature, said d-c generator means and said motor field winding;
- a voltage divider connected across said d-c generating means leads and including a pair of series connected resistors;
- a feedback circuit having one input lead connected to the juncture of said voltage divider resistors and a second input lead connected to the juncture of said motor armature and its associated field winding, said feedback circuit including means for generating a feedback signal proportional to the second derivative of the signal applied to said input leads; and
- a control circuit connected to effect the operation of said d-c generating means and connected to receive said feedback signal, said control circuit being responsive to said feedback signal to alter the operation of the d-c generating means.

11. The excavator drive system as recited in claim 10 in which a diode is connected in series with said voltage divider resistors.

12. The excavator drive system as recited in claim 10 in which said feedback circuit includes:
- a first capacitor and series connected resistor connected across said input leads; and
- a second capacitor and series connected resistor connected across said first resistor,
- wherein said control circuit is connected to said second resistor.

13. The excavator drive system as recited in claim 12 in which a first steering diode is connected in series with said first resistor to block current flow therethrough in one direction, and a second steering diode is connected in series with said second resistor to block current flow therethrough in one direction.

14. The excavator drive system as recited in claim 13 in which a third steering diode is connected in shunt with said first resistor and first steering diode to block current flow in the opposite direction therefrom and a fourth steering diode is connected in shunt with said second resistor and second steering diode to block current flow in the opposite direction therefrom.

* * * * *